US012544948B2

(12) United States Patent
Pabon

(10) Patent No.: US 12,544,948 B2
(45) Date of Patent: Feb. 10, 2026

(54) NOISE ATTENUATING BALLOON DEFLATION REGULATOR APPARATUS AND METHODS

(71) Applicant: Javier Pabon, Boca Raton, FL (US)

(72) Inventor: Javier Pabon, Boca Raton, FL (US)

( * ) Notice: Subject to any disclaimer, the term of this patent is extended or adjusted under 35 U.S.C. 154(b) by 104 days.

(21) Appl. No.: 18/655,209

(22) Filed: May 3, 2024

(65) Prior Publication Data

US 2024/0367335 A1 Nov. 7, 2024

Related U.S. Application Data

(60) Provisional application No. 63/464,188, filed on May 4, 2023.

(51) Int. Cl.
*B26F 1/24* (2006.01)

(52) U.S. Cl.
CPC .................................... *B26F 1/24* (2013.01)

(58) Field of Classification Search
CPC .................................... B26F 1/24; B26F 1/32
See application file for complete search history.

(56) References Cited

U.S. PATENT DOCUMENTS 326,160 A * 9/1885 Seaver et al. ............. B26F 1/32 83/660
2006/0236552 A1* 10/2006 Giles ......................... B67B 7/20 30/367
2011/0271533 A1* 11/2011 Lien .......................... B26F 1/32 30/366
2011/0283548 A1* 11/2011 White .................. A21C 11/106 30/301
2013/0085570 A1* 4/2013 Rose ......................... B26F 1/02 234/128
2014/0102278 A1* 4/2014 Hoffman ................... B26F 1/24 83/868
2015/0209168 A1* 7/2015 Arnholt ................... A61F 5/003 606/192
2015/0251330 A1* 9/2015 Garcia ...................... B26F 1/32 30/358
2016/0121508 A1* 5/2016 Levitin ..................... B26F 1/24 30/140
2016/0199073 A1* 7/2016 Nino ................. A61B 17/3496 606/184
2017/0144323 A1* 5/2017 Hare ......................... B26F 1/32
2020/0390495 A1* 12/2020 Maini ................ A61B 17/3478
2024/0210286 A1* 6/2024 Höjer ........................ G01N 1/04
2024/0382862 A1* 11/2024 Pabon .................... A63H 27/10

FOREIGN PATENT DOCUMENTS

EP 2026719 B1 * 5/2012 ........... A61F 5/0036

* cited by examiner

*Primary Examiner* — Omar Flores Sanchez
(74) *Attorney, Agent, or Firm* — Allen F. Bennett; Bennett Intellectual Property

(57) ABSTRACT

A noise attenuating balloon deflation regulator has a body with an adhesive panel on one side which adheres to an inflated balloon. A perforating pin is inserted through an aperture in the body and punctures an attached, inflated balloon. Because the region surrounding the puncture is held stationary by the adhesion panel, the puncture in the balloon cannot grow into a tear. The balloon deflates as air escapes through the aperture in the body of the deflation regulator.

8 Claims, 10 Drawing Sheets

Fig. 23
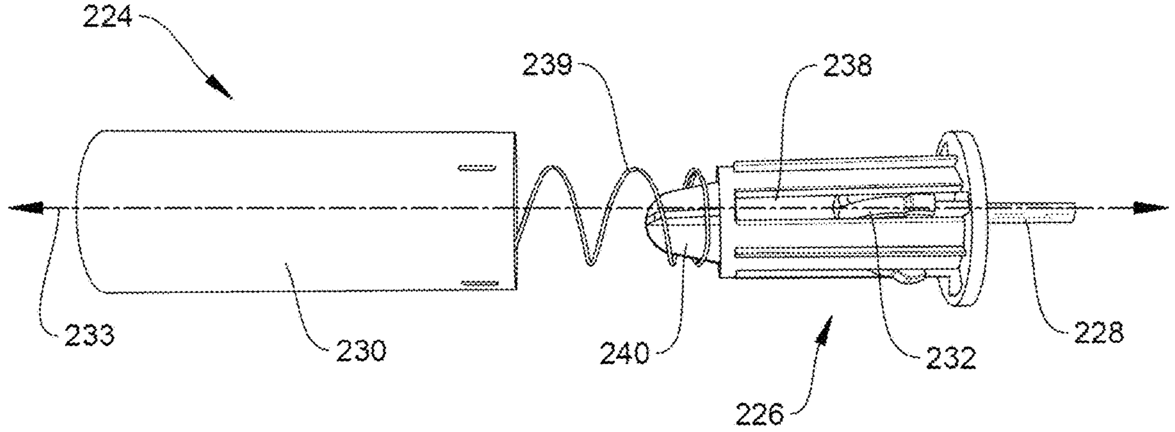
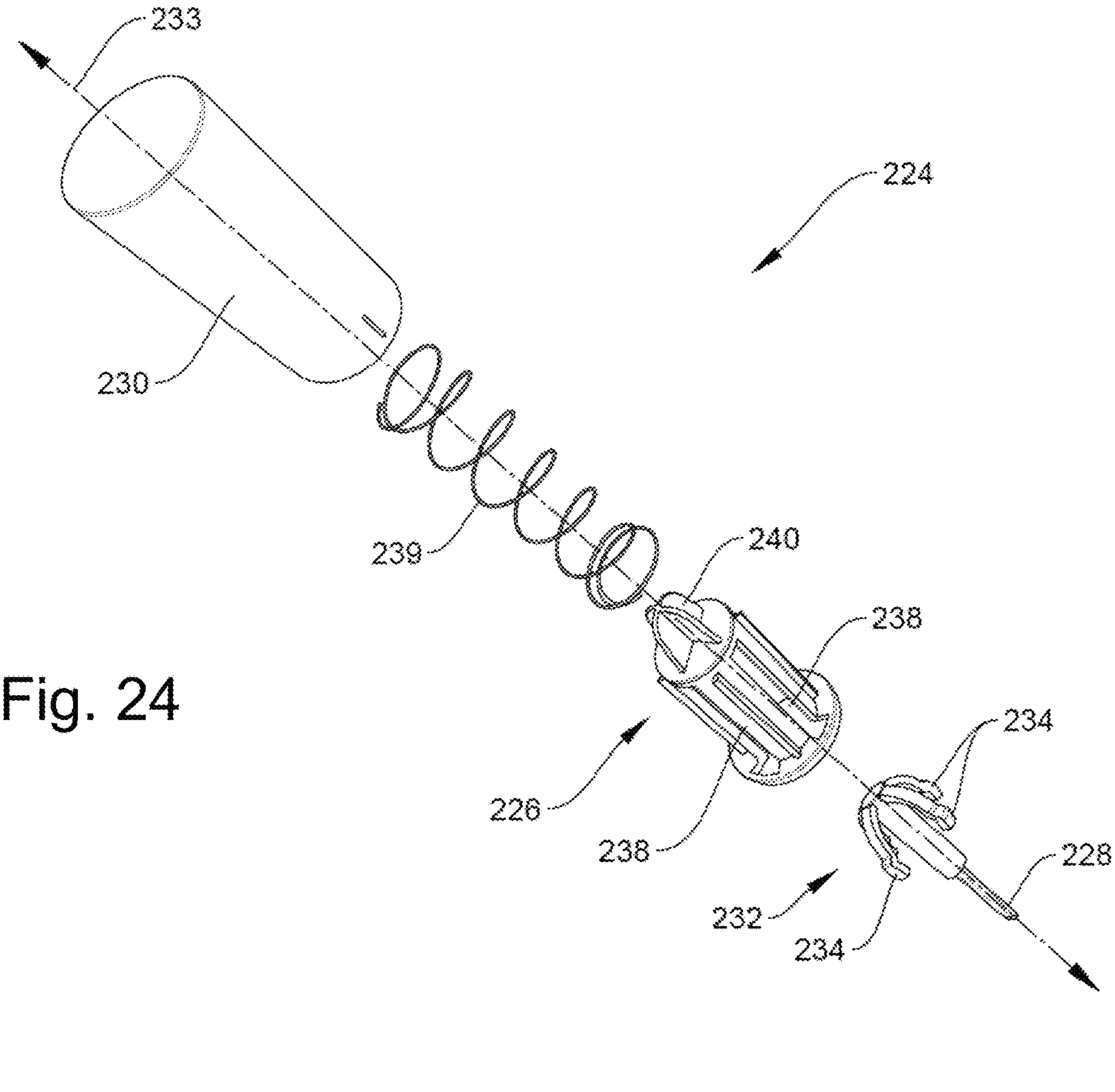
Fig. 24

NOISE ATTENUATING BALLOON DEFLATION REGULATOR APPARATUS AND METHODS

CROSS-REFERENCE TO RELATED APPLICATIONS

This application claims priority to U.S. Provisional Application Ser. No. 63/464,188 filed on May 4, 2023, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to devices for deflating balloons. More particularly, the invention relates to an apparatus and method for controlling the extraction of air from a balloon in a manner that reduces the associated noise.

Description of the Related Art

Balloons, which are ubiquitously used for various celebratory and decorative purposes, are typically inflated by inserting air or helium through a valve located at their neck. Once inflated, the valve is often sealed with a knot, effectively preventing air from escaping but simultaneously making subsequent deflation a challenge without damaging the balloon.

Traditionally, the balloon deflation has been accomplished through puncturing the balloon with a sharp object. This conventional approach, while effective in rapidly deflating balloons, is accompanied by the generation of loud popping noise. Such noises pose a risk to the eardrums in the immediate vicinity and are particularly detrimental to individuals with heightened noise sensitivities, including those diagnosed with autism or phonophobia. The abrupt and loud sound produced during the puncturing process not only poses a potential health risk but also creates an environment that can be distressing and unwelcoming for sensitive individuals. “Popping” a balloon also results in the balloon itself flying in an unpredictable direction and can be difficult to locate. This makes cleaning more time consuming and can lead to pollution when done outdoors. With the relatively recent increased awareness of the dangers of micro polymers in the environment, there is greater demand than ever to prevent improperly discarding materials such as torn, “popped” balloons.

An alternative to the puncturing method is the manual untying of the balloon’s knot. However, this method presents its own set of challenges. The process of untying a tightly secured knot is often both time-consuming and frustrating, posing a significant inconvenience to users seeking a quick and straightforward solution to balloon deflation. The inherent difficulties associated with the manual untying method underscore the limitations of existing approaches and highlight the necessity for innovation in the field of balloon deflation.

Recognizing these challenges, there exists a substantial need for a novel approach to balloon deflation. The ideal solution would circumvent the drawbacks of current methods by providing a means to deflate balloons both quietly and safely, without the risks associated with loud noises, the inconvenience of manual knot untangling, or losing the “popped” balloon. The principles of the invention address these concerns by introducing a device for deflating balloons in a manner that is not only efficient but also considers the well-being and comfort of individuals with noise sensitivities. Through this innovation, the process of balloon deflation is revolutionized, making it a safer, quieter, and more user-friendly experience.

The above-described deficiencies of today’s systems are merely intended to provide an overview of some of the problems of conventional systems, and are not intended to be exhaustive. Other problems with the state of the art and corresponding benefits of some of the various non-limiting embodiments may become further apparent upon review of the following detailed description.

BRIEF SUMMARY OF THE INVENTION

Disclosed is a balloon deflation regulator that provides a simple, efficient, and noise-controlled solution for deflating balloons. The invention comprises a perforating pin to initiate deflation, coupled with a mechanism to control the escape of air through a designated aperture. This feature ensures a quiet and controlled deflation process, mitigating the risk of loud noises and providing a safer environment for all individuals, especially those with sound sensitivities.

The device includes a handle attached to an adhesion panel. An adhesive material on one surface of the connector secures and stabilizes the balloon during deflation, preventing any unintended movement or noise generation. A perforating pin is extended through a central opening in the connector and punctures the rubber membrane of the balloon. Because the connector secures the balloon’s membrane, it does not rapidly tear and “pop.” Instead, deflation is controlled and slowed. Once deflated, the balloon may be removed from the collector and safely disposed of.

It is therefore an object of the present invention to provide a novel solution to the problem of balloon deflation, addressing the limitations and challenges associated with traditional methods.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated.

There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 23 is a partially exploded view of an alternative embodiment of a perforation pin actuator for a noise attenuating balloon deflation regulator in accordance with the principles of the invention;

FIG. 24 is an exploded view of an alternative embodiment of a perforation pin actuator for a noise attenuating balloon deflation regulator in accordance with the principles of the invention.

DETAILED DESCRIPTION

Figure 1:
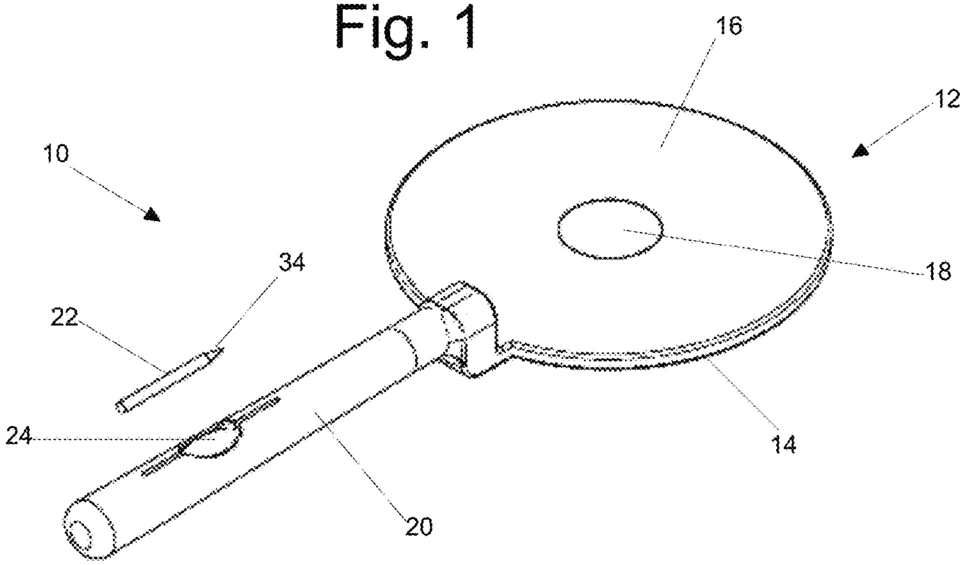
FIG. 1 is a perspective view of a noise attenuating balloon deflation regulator in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term “about”. The term “a” or “an” as used herein means “at least one” unless specified otherwise. In this specification and the claims, the use of the singular includes the plural unless specifically stated otherwise. In addition, use of “or” means “and/or” unless stated otherwise. Moreover, the use of the term “including”, as well as other forms, such as “includes” and “included”, is not limiting. Also, terms such as “element" or "component" encompass both elements and components comprising one unit and elements and components that comprise more than one unit unless specifically stated otherwise.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly shown in the Figures. Unless expressly stated otherwise, components described in one embodiment may be interchanged with components of the same name found in other embodiments. Such permutations are expressly within the scope of this disclosure.

The noise attenuating balloon deflation regulator of the invention is affixed to a balloon by adhering the balloon to the adhesion panel on one side of the body of the regulator. Once secured to the adhesion panel, the balloon is punctured by a perforation pin extending through a central opening in the adhesion panel. The region about the perforation point of the balloon's membrane is thus immobilized during the deflation process, which prevents tearing and prevents the balloon from being propelled by the rapid extraction of air.

The perforation pin is designed to penetrate the balloon material without requiring excessive force. The body of the regulator device has an adhesion panel on one side, and a handle extending in a radial direction, parallel to the plane of the body.

The collector has a body. One side of the body is an adhesion panel that adheres to a region of the balloon's stretched membrane and secures and immobilizes it in place. The body has a central aperture through which the perforation pin is applied to the balloon's membrane to puncture it. Once the balloon is punctured, air escapes through the central aperture which the membrane remains affixed to the adhesion panel. This prevents tears in the balloon's membrane from growing beyond the region of the balloon defined by the aperture. The attenuation of the rate of deflation of the balloon is thus correlated with the dimensions of the aperture. The air release is controlled, and a balance between efficient deflation and noise reduction thus achieved.

The adhesion panel may incorporates an advanced adhesive material, or may use mechanical means for firmly and securely affixing to the region of an inflated balloon. This material is engineered to secure the balloon in place during the deflation process, preventing it from slipping or contracting too rapidly, which could potentially generate noise. The adhesive is reusable and retains its properties over multiple uses, making the device both economical and environmentally friendly. It is designed to accommodate balloons of various sizes and materials, ensuring a stable and controlled deflation across a wide range of applications.

An ergonomically designed handle is connected to the body, providing users with a comfortable grip and control over the device. The handle may optionally house optional components such as an actuator for the perforation pin, a mechanical or automated depressurizing mechanism, and/or electrical components for wireless connectivity.

The body may be sized and configured to be optimized for a particular range of balloon dimensions, from small party balloons to large decorative types. In many embodiments, the body is annular, however, it may have other configurations. The adhesion surfaces securely holds a balloon during deflation, with different surface sizes easily swapped in to match the balloon's size. This innovation underscores the device's adaptability and broad applicability.

Figure 2:
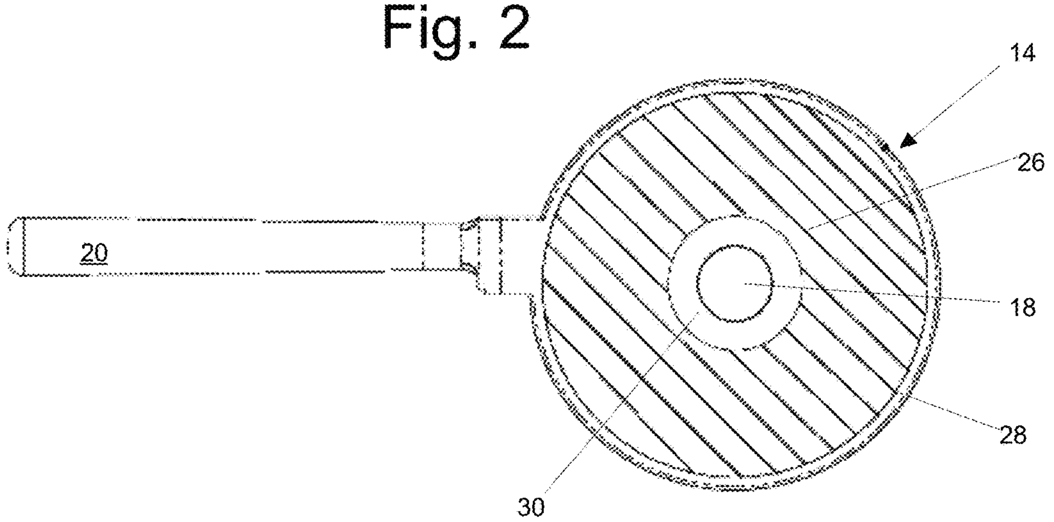
FIG. 2 is a bottom plan view of a noise attenuating balloon deflation regulator in accordance with principles of the invention.
Figure 3:
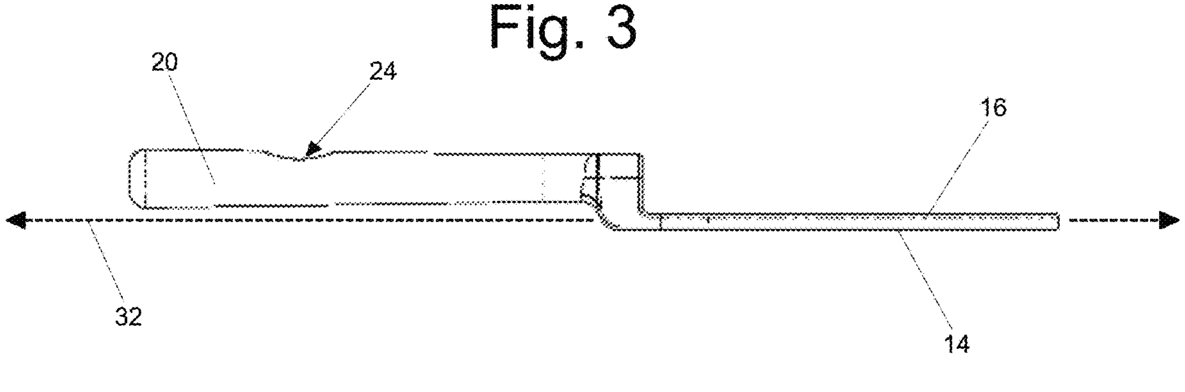
FIG. 3 is a side elevation view of a noise attenuating balloon deflation regulator in accordance principles of the invention.
Figure 4:
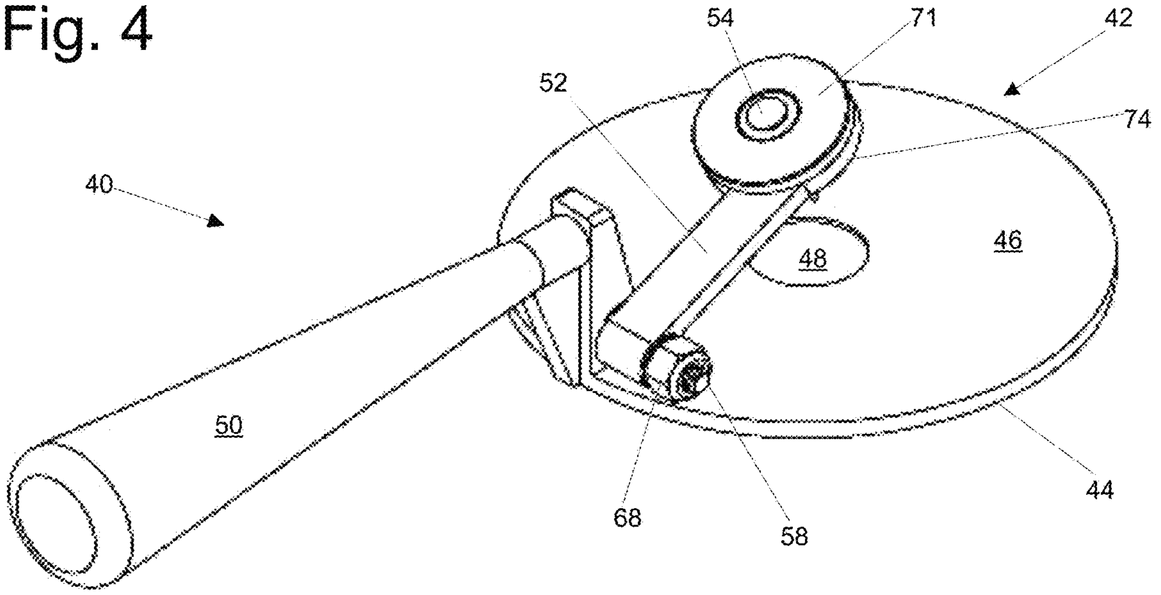
FIG. 4 is a perspective view of an alternative embodiment of a noise attenuating balloon deflation regulator in accordance with principles of the invention.
Figure 5:
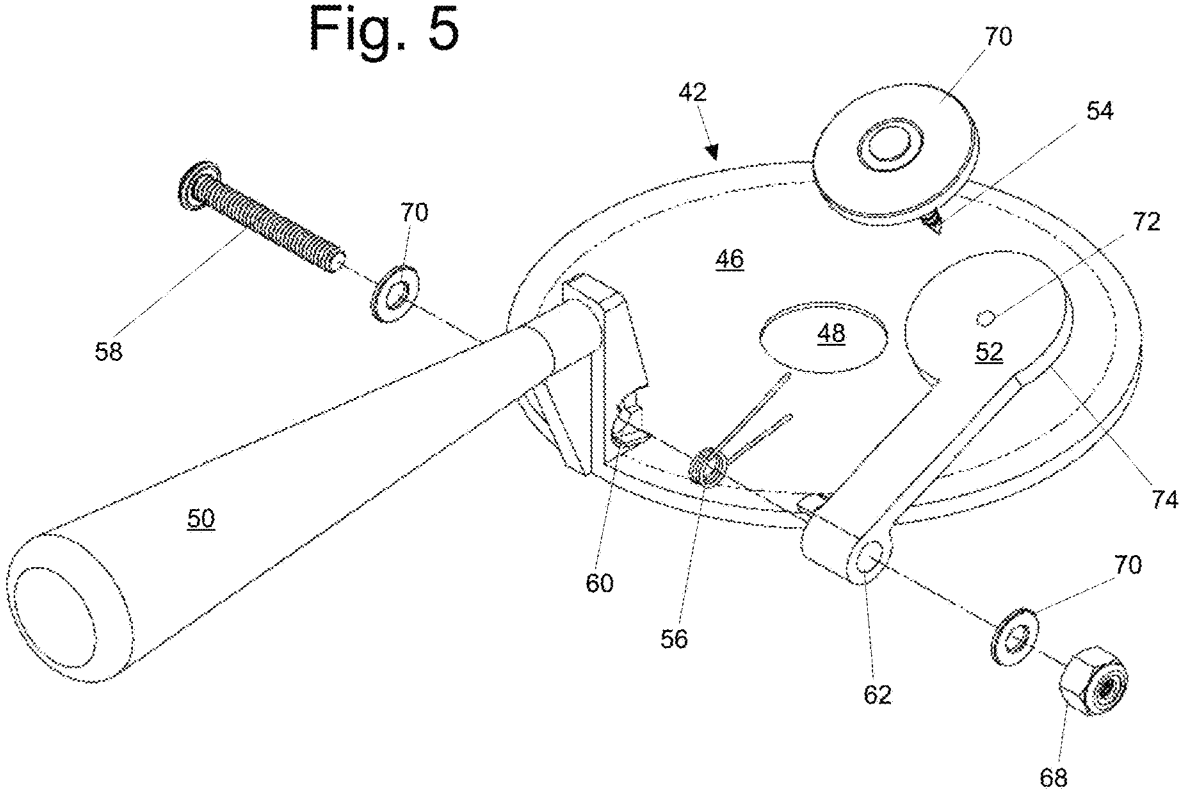
FIG. 5 is an exploded perspective view of an alternative embodiment of a noise attenuating balloon deflation regulator in accordance with the principles of the invention.
Figure 6:
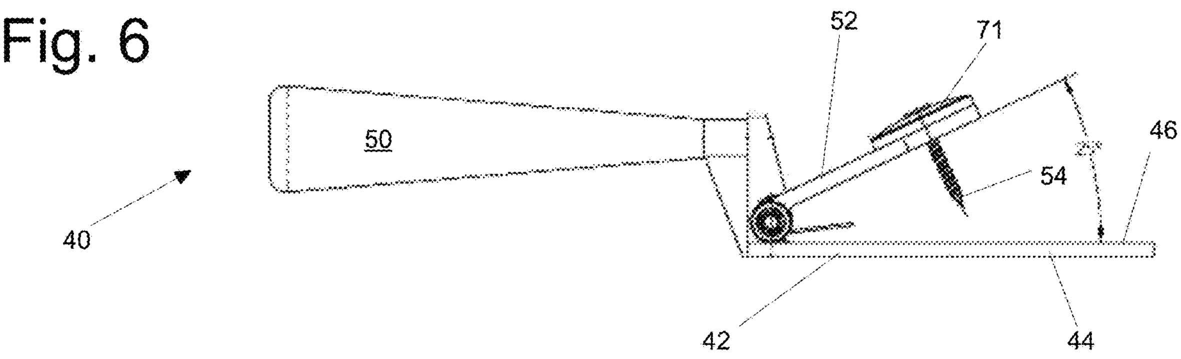
FIG. 6 is a side elevation view of an alternative embodiment of a noise attenuating balloon deflation regulator in accordance with principles of the invention.

FIGS. 1-3 show a noise attenuating balloon deflation regulator 10 in accordance with principles of the invention. The regulator 10 includes a body 12 having a first side 14, a second side 16, and a central aperture 18. A handle 20 extends outward from one side of the body 12. A perforating pin 22 is removably secured within a slot 24 in the handle 20. The body 12 is substantially planar, with the first side 14 being substantially covered by an adhesion panel 26. The adhesion panel 26 is configured to engage and adhere to a typical balloon formed of rubber or plastic material. In this embodiment, the adhesion panel 26 covers most of the first side 14, except for the periphery 28 and a small annular region 30 surrounding the aperture 18. The adhesion panel 26 has an adhesive coating. Those skilled in the art will appreciate that there are a wide variety of adhesives suitable for coding the adhesion panel 26. The adhesion panel 26 may optionally be replaceable so that once the adhesive material on a panel 26 "wears out" the panel may be replaced.

In this embodiment, the handle 20 is positioned opposite to the adhesion panel 26. I.e., the handle 20 is positioned on the side of a plane 32 defined by the body 12 opposite to the adhesion panel 26. This configuration helps prevent the handle 20 and the operator's hand from getting in the way of the adhesion panel 26 adhering to a balloon. In this embodiment, the handle 20 is substantially parallel to the plane 32 defined by the body 12. Optionally, the handle 20 may extend away from the body 12 in any direction so long as it is on the opposite side of plane 32 from the adhesion panel 26. Optionally, the handle 20 may lie in the plane 32 and/or take other configurations. However, it is generally preferred to have the handle on the opposite side of the body 12 from the adhesion panel 26. The handle 20 of this embodiment is substantially cylindrical. Those skilled in the art will appreciate that the handle 20 may have a variety of geometric configurations so long as they are suitably shaped for a hand to firmly grasp it.

The perforating pin 22 has a sharp point 34 on one end, and is suitable for penetrating and creating a whole in a typical balloon. In this embodiment, the slot 24 for storing the pin 22 is located on the handle 20. Optionally, the slot 24 may be positioned on the second side 16, or any other location on the regulator 10 so long as it is readily available once the adhesion panel 26 has adhered to a balloon. In some embodiments, the first side 14 and/or the adhesion panel 26 may be flexible and/or concave or convex to improve engaging with a balloon.

The body 12 of this embodiment is annular, defined by a circular periphery 36 and the circular aperture 18. Those skilled in the art will appreciate that the body 12 may take a variety of configurations, but is generally preferred for at least the adhesion panel 26 to be substantially planar. When the body 12 is substantially planar and both the first side 14 and the second side 16 are substantially flat, this generally improves the ergonomics of the device, making access to the central aperture from the second side 16 easier. Similarly, an annular adhesion panel 26 optimizes radial symmetry of adhesion to a balloon about the aperture 18. Without being bound by theory, the inventors believe that by the adhesion panel 26 adhering continuously to the balloon around the central aperture prevents a perforation of a balloon within the aperture creates radially symmetric tension within the balloon material, thereby preventing a perforation from growing into a tear which results in rapid deflation and the unpleasant "pop" sound associated with deflating balloons.

Therefore, again without being bound by theory, the inventors believe that the principles of the invention are optimized when the adhesion panel 26 is configured to adhere to a balloon in a radially symmetric manner.

FIGS. 4-8 show an alternative embodiment of a regulator 40 in accordance with the principles of the invention. As will be appreciated by those skilled in the art, the regulator 40 operates on the same principles as regulator 10 described above, but has several features to simplify operation. Regulator 40 includes a body 42 having a first side 44, a second side 46 and a central aperture 48. The handle 50 extends outward from the body 42 and is also opposite to the first side 44 and substantially parallel to a plane defined by the body 42. Regulator 40 also includes a pivot arm 52 connected to a perforating pin 54. The pivot arm 52 is biased away from the aperture 48 by a spring 56. The pivot pin 58 is simply a bolt extending through an opening 60 in the handle 50 and then opening 62 in the proximal ends 64 of the pivot arm 52 and held in place by a bolt 68 and two washers 70. The perforating pin 54 is affixed to a pin base 71 and extends through an opening 72 in the circular distal end 74 of the pivot arm 52. The perforating pin 54 may simply be a screw and the opening 72 may be threaded as one means of attaching the perforating pin 54 to the pivot arm 52. The perforating pin 54 may be replaced if it is broken.

Figure 7:
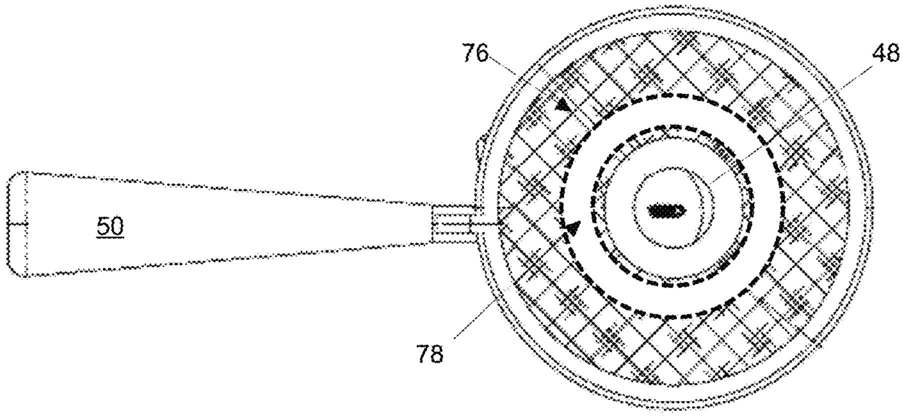
FIG. 7 is a bottom plan view of an alternative embodiment of a noise attenuating balloon deflation regulator in accordance with principles of the invention.
Figure 8:
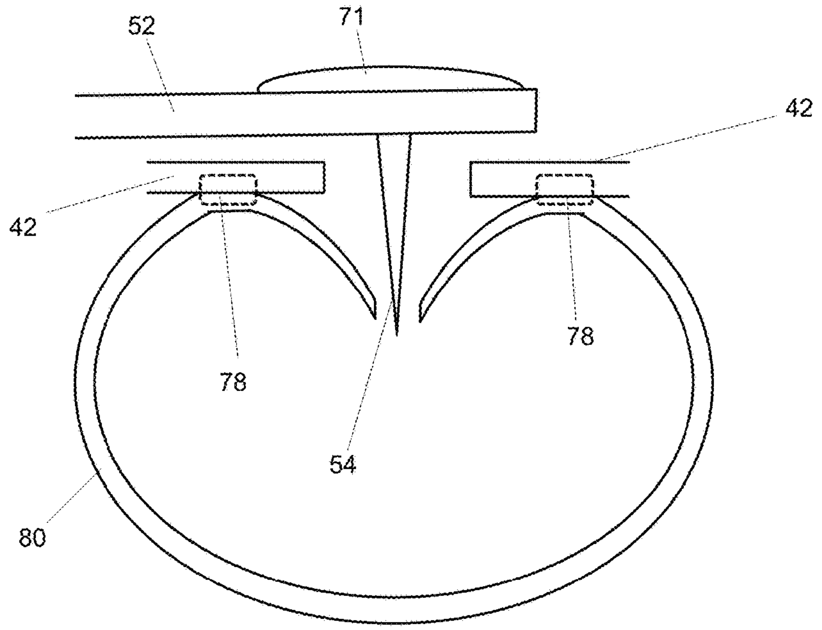
FIG. 8 is a cross-sectional view of an alternative embodiment of a noise attenuating balloon deflation regulator adhered to a balloon in accordance with the principles of the invention.
Figure 9:
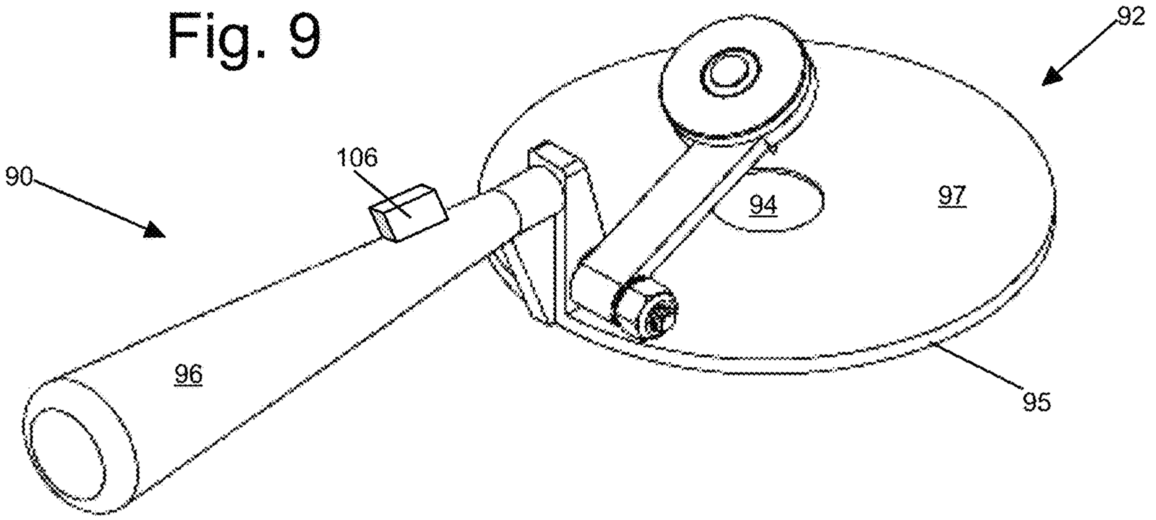
FIG. 9 is a perspective view of another alternative embodiment of a noise attenuating balloon deflation regulator in accordance with the principles of the invention.

FIGS. 7 and 8 show the regulator 40 in operation in accordance with the principles of the invention. The first side 44 of the body 42 has an adhesion panel 76 which is impinged upon an inflated balloon 80 such that the balloon 80 and the adhesion panel 76 adhered to one another in the region 78. Region 78 is substantially concentric with aperture 48 and creates a substantially continuous connection between the adhesion panel 76 and the balloon 80. Once the balloon is adhered to adhesion panel 76, the pivot arm 52 is actuated such that the perforating pin 54 is extended through the aperture 48 and perforates the balloon 80 to form a puncture 82. Because the balloon 80 remains affixed to the adhesion panel 76 at region 78, the puncture 82 does not grow along the surface of the balloon 80 into a substantial tear. Rather, the size to which the puncture 82 may grow is limited by the region 78. Escaping air travels through the aperture 48. While the balloon still deflates rapidly, the deflation is regulated sufficiently to slow it down to attenuate, i.e. reduce, the noise generated during the deflation process. In other words, when the deflation regulator is used, no "pop" is generated as the balloon deflates. In addition, the deflated balloon remains attached to the regulator and may then be removed and disposed of. This prevents the deflating balloon from flying away in a random direction and possibly getting lost.

FIGS. 9 to 12 show another alternative embodiment of a noise attenuating balloon deflation regulator 90 in accordance with the principles of the invention. Regulator 90 has all of the same components found in regulator 40 shown in FIGS. 4-8, with a few extra components. Regulator 90 has an annular body 92 with a central aperture 94, first side 95 and second side 97. The handle 96 extends radially outward from the body 92 on the side opposite to an adhesion panel 98. A pivot arm 100 holds a perforating pin 102 and is biased by a spring 104. A pivot arm actuator button 106 is located on the handle 96. When the actuator button 106 is depressed, the pivot arm swings toward the body 92 such that the perforating pin 92 extends through the aperture 94. This allows the regulator 90 to be easily operated with one hand.

Figure 10:
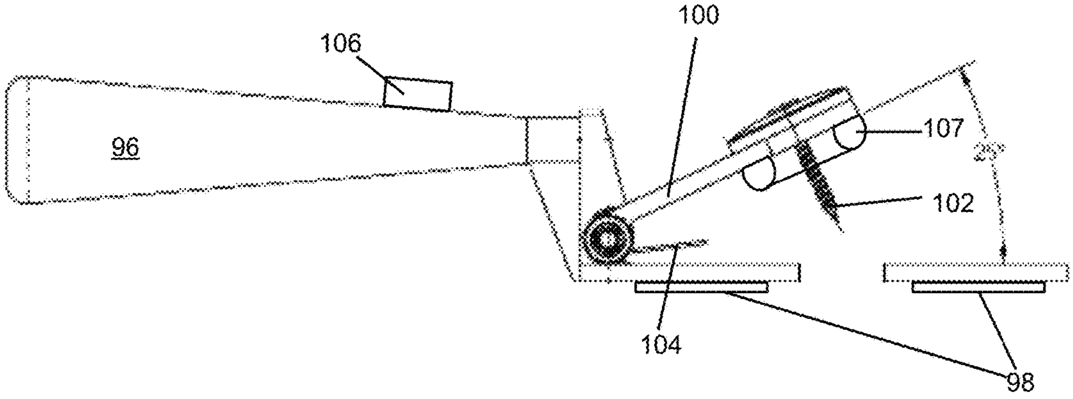
FIG. 10 is a side elevation view of another alternative embodiment of a noise attenuating balloon deflation regulator in accordance with principles of the invention.
Figure 11:
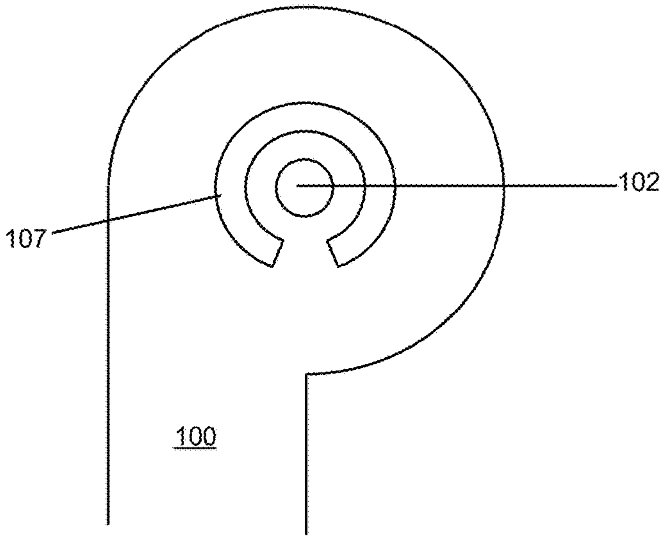
FIG. 11 is a bottom plan view of a pivot arm for a noise attenuating balloon deflation regulator in accordance with the principles of the invention.
Figure 12:
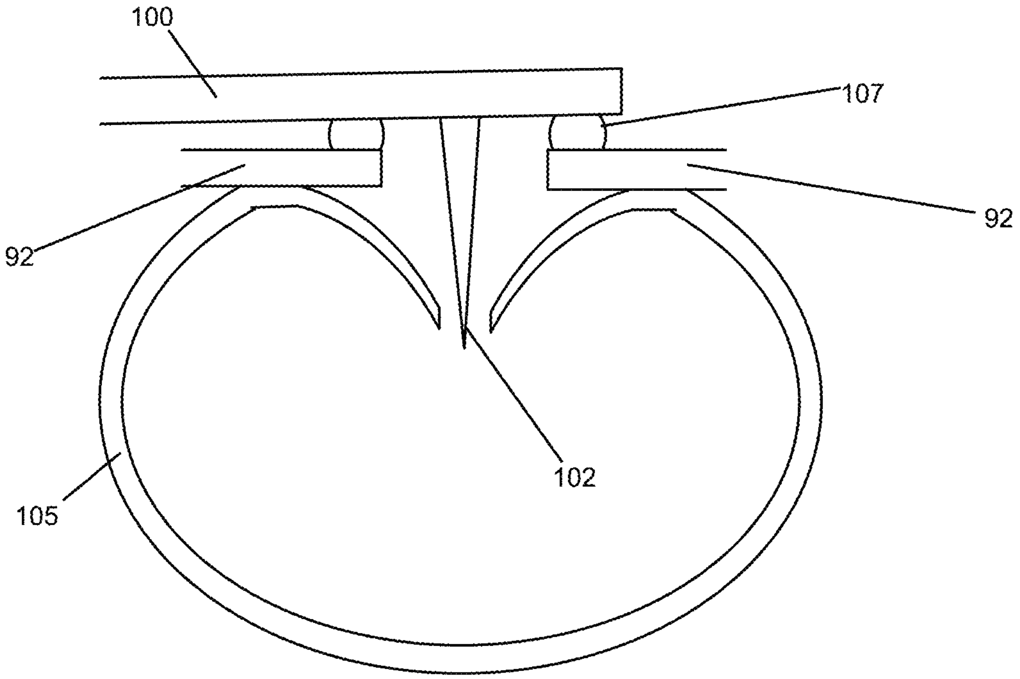
FIG. 12 is a cross-sectional view of another alternative embodiment of a noise attenuating balloon deflation regulator adhered to a balloon in accordance with the principles of the invention.

Regulator 90 also includes a circular cushion 107 on the pivot arm 100 which substantially surrounds the perforating pin 102. When the pivot arm 100 is actuated, the circular cushion 107 engages and forms a seal with second side 97. When a balloon 110 is punctured, as shown in FIG. 11, air escaping the puncture travels through the aperture 94. The cushion 107 forms a seal between the pivot arm 100 and the body 92. The circular cushion 107 of this embodiment is "C" shaped and thus not continuous, having an opening 110. Air escaping the balloon and traveling through the aperture 94 is further slowed because it is limited to escaping through the opening 110 in the cushion 107. The cushion 107 thus further regulates deflation of a balloon 105. Optionally, the cushion 107 may be continuous and the rate at which air travels through the aperture may be controlled by adjusting the pressure an operator places on the actuator button 106. By reducing pressure on the actuator button 106, the operator allows air to escape between the cushion 106 in the body 92. In this embodiment, as shown in FIG. 10, pivot arm 100 is configured to translate from an open position where it is rotated approximately 25° relative to the body 92, to a closed position in which the pivot arm 100 is rotated so that it is substantially parallel to the body 92. Those skilled in the art will appreciate that the maximum angle of rotation of the pivot arm 100 may be widely varied, limiting the maximum open position reduces exposure of the pivot pin. Limiting the rotation of the pivot arm to 30° or less minimizes exposure of the pivot pin, thus reducing likelihood of injury from the pen as well as damage to the pit. The inclusion of the cushion 107 may also further limit exposure of the pivot pin, thereby reducing the likelihood of accidental injury on the operator as well as preventing damage to the pen.

Figure 13:
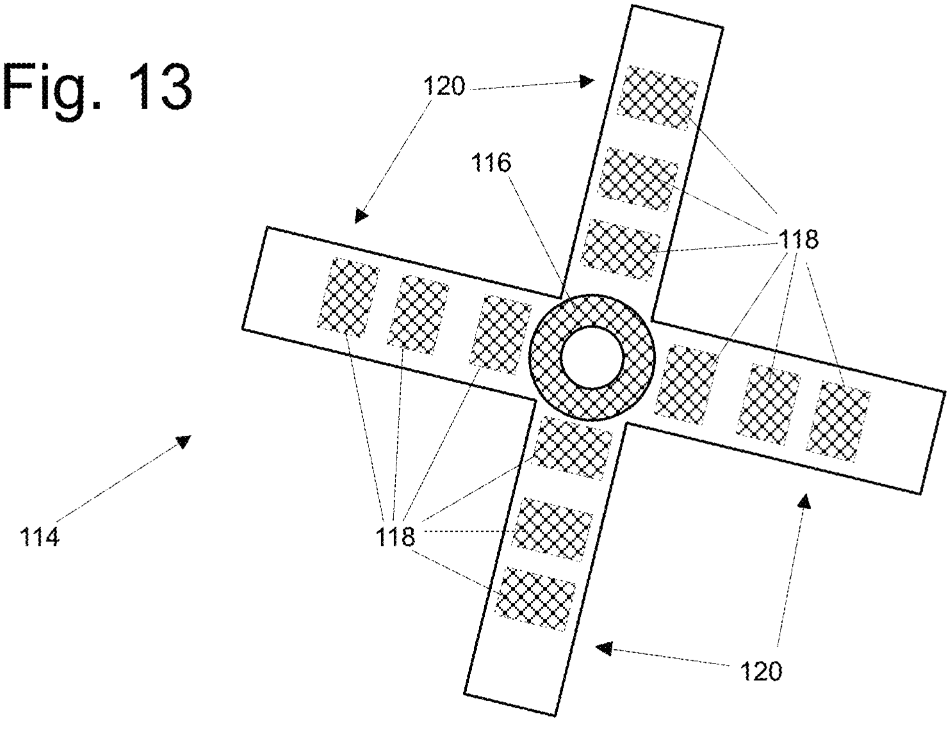
FIG. 13 is a bottom plan view of an alternative embodiment of a body having adhesion panels on a first side for a noise attenuating balloon deflation regulator in accordance with the principles of the invention.

FIG. 13 shows an alternative embodiment of a body 114 in accordance with the principles of the invention. In this embodiment, body 114 is cruciform and has an annular central adhesion panel 116 as well as a plurality of adhesion panels 118 along each arm 120 of the body 114. The arms 120 are flexible. Body 114 may be utilized in place of the body shown in the other embodiments. The flexible arms 120 allow the body 114 to adhere to a much larger region of a balloon. The use of flexible adhesion arms may also make it easier to attach the body 114 to a balloon. An operator may rapidly swing a regulator having such a body 114 such that when it impinges upon a balloon the arms automatically spread across the surface of the balloon.

Figure 14:
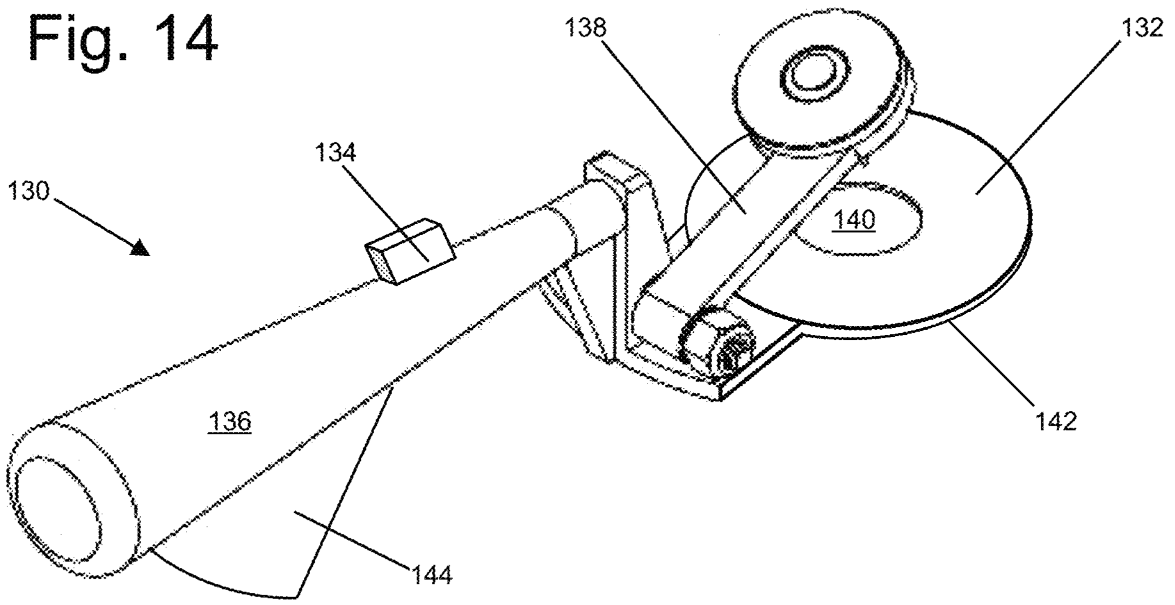
FIG. 14 is a perspective view of another alternative embodiment of a noise attenuating balloon deflation regulator in accordance with principles of the invention.
Figure 15:
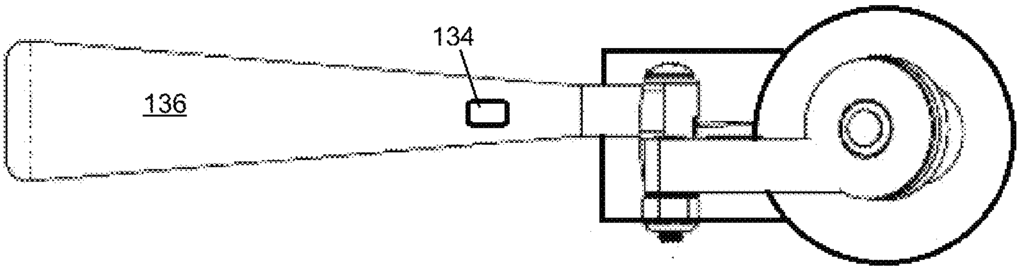
FIG. 15 is a top plan view of another alternative embodiment of a noise attenuating balloon deflation regulator in accordance with principles of the invention.
Figure 16:
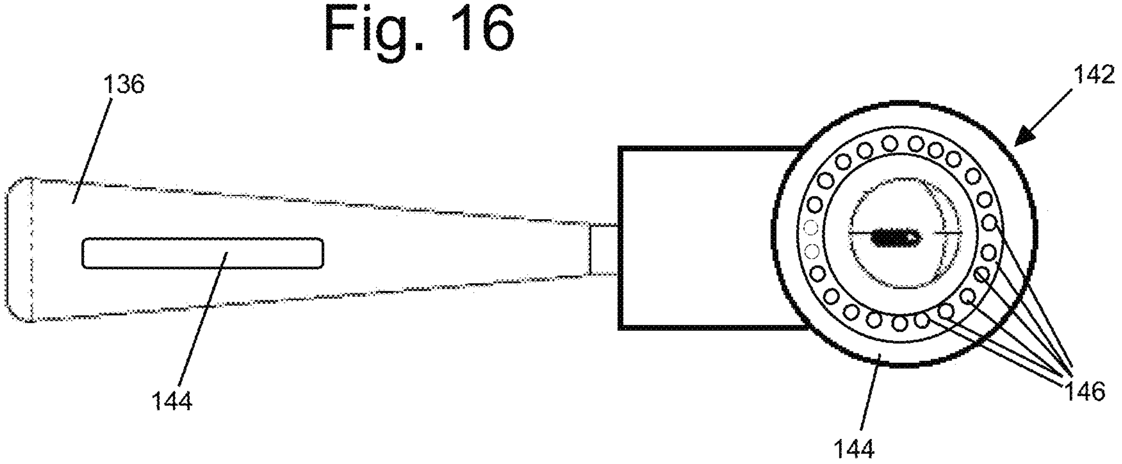
FIG. 16 is a bottom plan view of another alternative embodiment of a noise attenuating balloon deflation regulator in accordance with the principles of the invention.

FIGS. 14 to 16 show another alternative embodiment of a noise attenuating balloon deflation regulator 130 in accordance with the principles of the invention. Regulator 130 has a body 132 which is substantially smaller than the bodies of regulator shown above. Like regulator 40 above, regulator 130 has an actuator button 134 on its handle 136. The actuator button 134 when depressed rotates pivot arm 138 toward the aperture 140 in the body 132. The pivot arm 138 has a range of motion of about 35°. The first side 142 of the body 132 includes an adhesion panel 144 comprised of a circle of suction ports 146. Unlike other embodiments, the adhesion panel 144 of regulator 130 does not have an adhesive coating. Instead, it includes several small suction ports 146. When lever 144 on the handle 136 is actuated, it provides suction to the suction ports 146 the adhesion panel 144 bus adheres to a balloon by means of vacuum, or suction, rather than chemical or physical adhesion. So long as the lever 144, which may be actuated by an operator's hand while the actuator button 134 is operated by a thumb, is depressed, a balloon is held in place. Once a balloon is adhered to adhesion panel 144, the pivot arm 138 may be actuated to puncture a balloon held in place by adhesion panel 144. Those skilled in the art will appreciate that the invention may be practiced using an adhesive coating, a suction mechanism, or a combination thereof.

Figure 17:
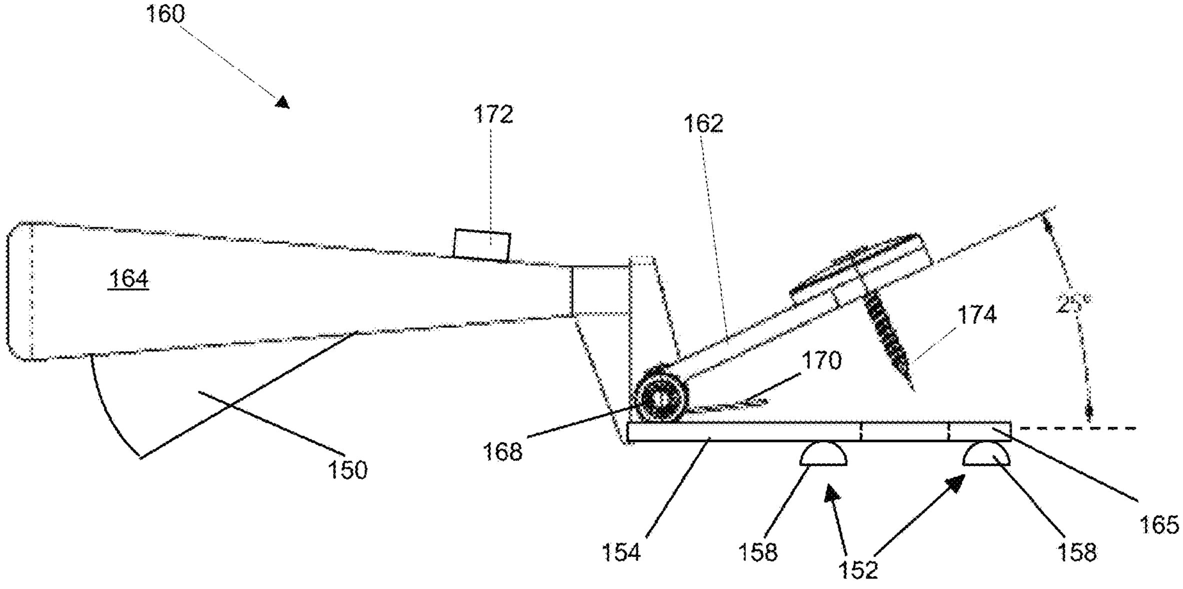
FIG. 17 is a side plan view of another alternative embodiment of a noise attenuating balloon deflation regulator to accordance with the principles of the invention.
Figure 18:
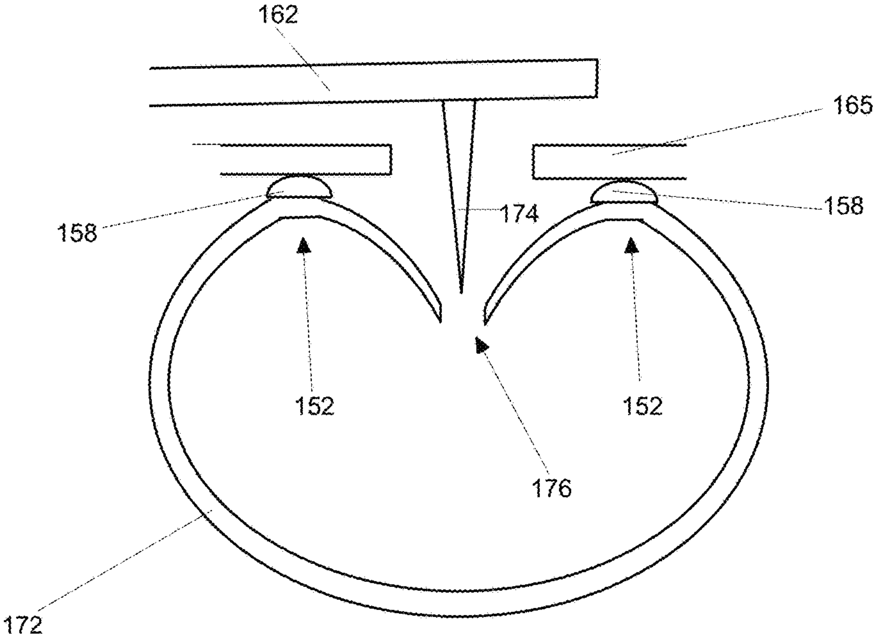
FIG. 18 is a cross-sectional view of another alternative embodiment of a noise attenuating balloon deflation regulator adhered to a balloon in accordance with principles of the invention.

FIGS. 17 and 18 show another alternative embodiment of a noise attenuating balloon deflation regulator 160 in accordance with the principles of the invention. Regulator 160 has all the same features and functionality of regulator 130 above. Pivot arm 162 rotates between a depressed position parallel to and flush against the body 165 and an open position in which the arm 162 is approximately 25° relative to the body 165, rotated about the pivot pin 168. The pivot arm 162 is biased in the open position by spring 170. The pivot arm 162 is actuated by depressing the actuator button 172 on the handle 164. By depressing lever 150, suction is provided to the suction ports 152 on the first side 154 of the body 165. In this embodiment, suction ports 152 include flexible lips 158 extending along the rims of the suction ports. The flexible lips 158 take the form of suction cups. Those skilled in the art will appreciate that configuration of a suction cup around a suction port may enhance the ability of the suction ports 152 to strongly adhere to a balloon 172 as it is punctured by the perforating pin 174 as shown in FIG. 17. As explained above, by tightly adhering to the balloon 172, the balloon remains fixed to the body 165 and prevents the perforation 176 from growing into a tear and causing the balloon to emanate a popping sound as it deflates.

Figure 19:
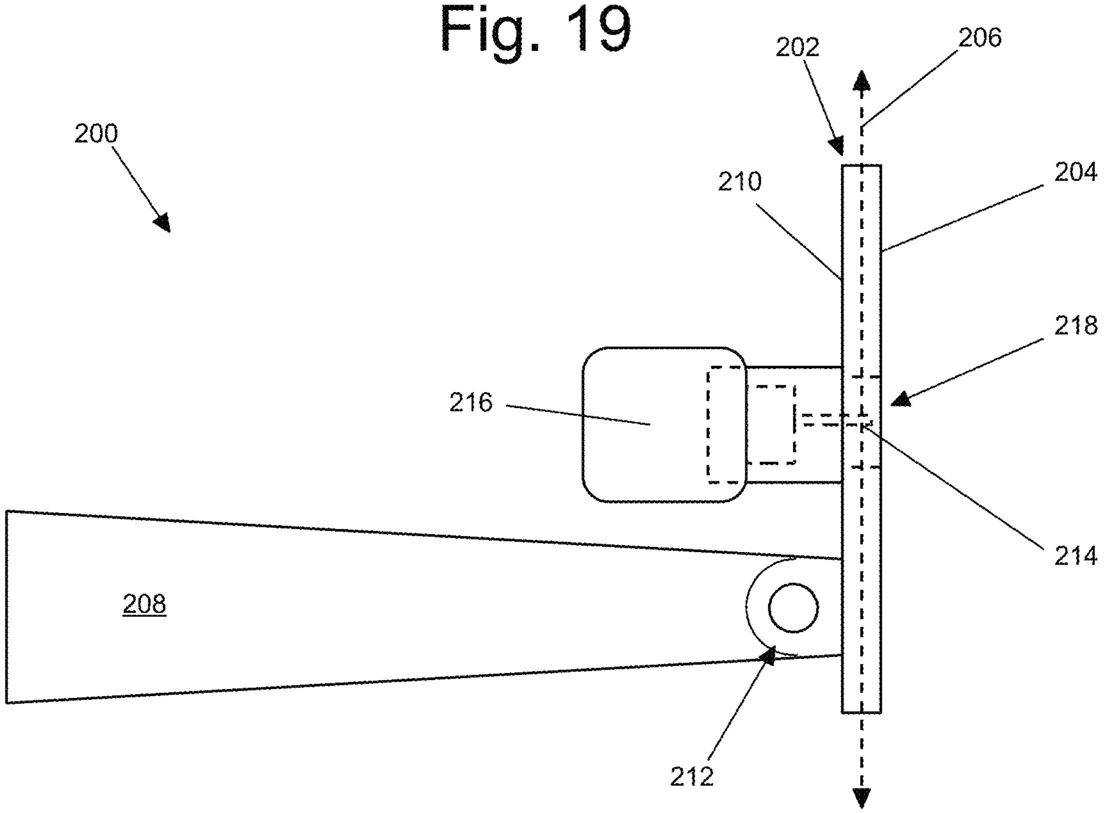
FIG. 19 is a side plan view of another alternative embodiment of a noise attenuating balloon deflation regulator with a perforation pin in the retracted position in accordance with the principles of the invention.
Figure 20:
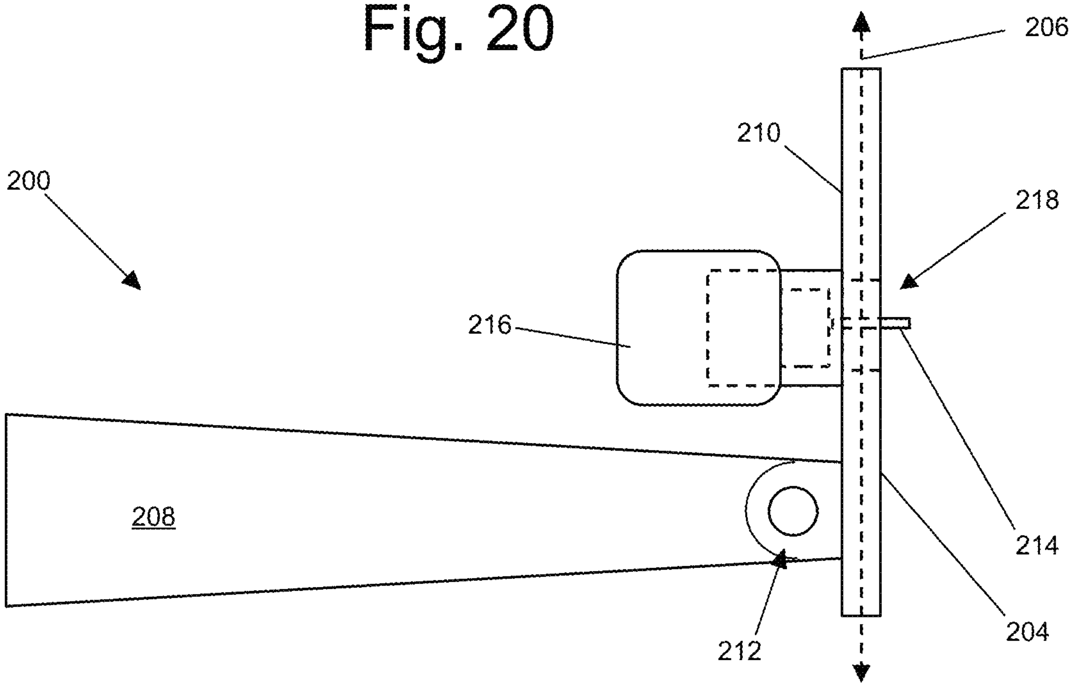
FIG. 20 is a side plan view of another alternative embodiment of a noise attenuating balloon deflation regulator with a perforation pin in the extended position in accordance with the principles of the invention.
Figure 21:
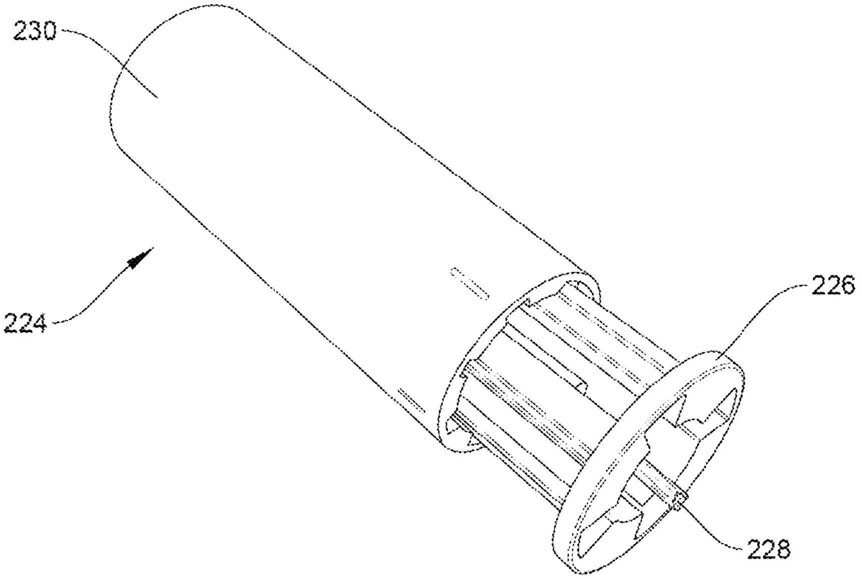
FIG. 21 is a perspective view of an alternative embodiment of a perforation pin actuator in a retracted configuration for a noise attenuating balloon deflation regulator in accordance with the principles of the invention.

FIGS. 19 and 20 show another alternative embodiment of a noise attenuating balloon deflation regulator 200 in accordance with the principles of the invention. The regulator 200 includes a circular, planar body 202 having an adhesion panel 204 having an adhesive coating for adhering to an inflated balloon. The body 202 of regulator 200 is essentially the same as the regulator bodies shown in FIGS. 1 to 10. The body 202 defines a plane 206 with the adhesion panel 204 on a first side and a handle 208 extending from the opposing side 210 in a direction substantially perpendicular to the body 202. As explained above, the handle may be configured in most any direction so long it is on the side of the plane 206 opposite to the adhesion panel 204. Optionally, the handle 208 may be fixed at a particular angle, such as perpendicular to the body 202. The handle 208 is connected to the body 202 by a pivoting hinge 212 that allows an operator to adjust the angle of the handle 208 relative to the body 202.

FIGS. 19 and 20 include a perforation pin 214 which is actuated by a push button 216 positioned over the aperture 218. The pushbutton 216 is biased in a direction away from the body 202 such that the perforation pin 214 does not extend beyond the adhesion panel 204, as shown in FIG. 19. Once a balloon has been affixed to the adhesion panel 204, an operator depresses the pushbutton 216, causing the perforation pin 214 to extend out of the aperture 218, as shown in FIG. 20, thus puncturing a balloon attached to the adhesion panel 204. Those skilled in the art will appreciate that the pushbutton actuated perforation pin and/or handle shown in FIGS. 19 and 20 may also be used to replace the perforation pin and/or handle in the previous embodiments.

Figure 22:
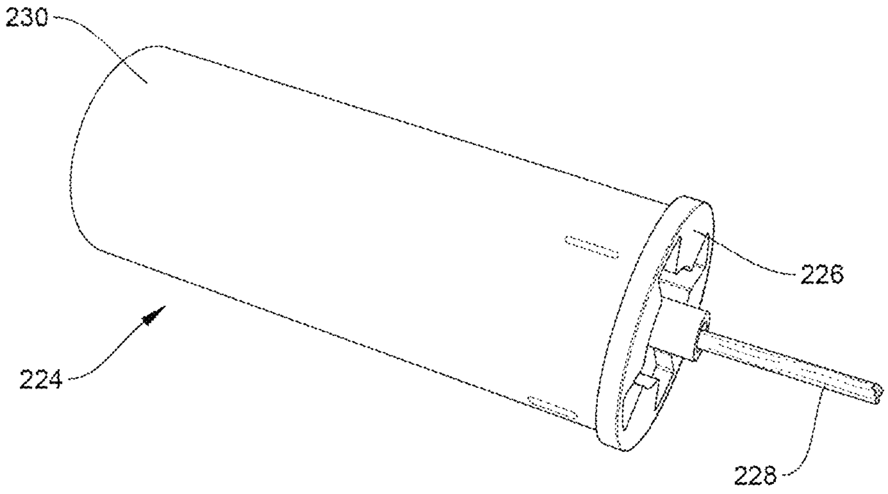
FIG. 22 is a perspective view of an alternative embodiment of a perforation pin actuator in an extended configuration for a noise attenuating balloon deflation regulator in accordance with the principles of the invention.

FIGS. 21 to 24 show an embodiment of a perforation pin actuator 224 suitable for use with the regulator 200, and may also be used to replace other mechanisms for actuating the perforation pin in the other embodiments described herein. The base 226 of the actuator 224 may be attached over an aperture of a regulator body on the side opposite to the adhesion panel. A perforation pin 228 is housed inside the actuator 224. A pushbutton 230 extends partially over the actuator 224 and is biased in the retracted position shown in FIG. 21. When the pushbutton 230 is retracted, it only extends partially, if at all, from the base 226. Thus, in the retracted position the pushbutton 230 does not extend a sufficient distance to extend through an aperture and intends upon a balloon. When the pushbutton 230 is depressed toward the base 226, as shown in FIG. 22, the perforation pin 228 fully extends out of the actuator 224 such that it extends through an aperture and punctures a balloon.

FIGS. 23 and 24 show partially exploded and exploded views of the actuator 224. The perforation pin 228 is attached to a sliding carriage 232 capable of sliding up and down, along a longitudinal axis 233 through the base 226. The sliding carriage 232 includes a plurality of laterally extending guide arms 234 that extend through the longitudinal channels 238 in the base 226. A spring 239 is positioned between the top 240 of the base 226 and the pushbutton 230, and biases the pushbutton 230 in an upward direction, outward along axis 233. The guide arms 234 of the sliding carriage 232 attached to the pushbutton 230 so that the spring 238 biases the perforation pin 228 in a retracted position. The longitudinal channels 238 may also serve as air channels through which air escaping from a punctured balloon may exit after the air passes through an aperture. Those skilled in the art will appreciate that this is just one example of a pushbutton actuator that may be used to actuate a perforation pin.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A noise attenuating balloon deflation regulator comprising:

a body having an adhesion panel on a first planar surface;

a central aperture extending through the body from an opposing side to the adhesion panel;

a handle extending from the body; and, a perforation pin extendable through the central aperture.

2. The noise attenuating balloon deflation regulator of claim 1 further comprising a pivoting arm to which the perforation pin is attached, wherein the perforation pin is extended through the central aperture by rotating the pivoting arm into a configuration parallel to the body.

3. The noise attenuating balloon deflation regulator of claim 1 wherein the adhesion panel is coated with an adhesive layer.

4. The noise attenuating balloon deflation regulator of claim 1 wherein the adhesion panel includes a plurality of suction cups.

5. The noise attenuating balloon deflation regulator of claim 2 wherein the handle includes button for actuating pivot arm.

6. The noise attenuating balloon deflation regulator of claim 4 wherein the handle includes lever for actuating suction cups.

7. The noise attenuating balloon deflation regulator of claim 3 wherein the handle extends in a direction perpendicular to the body and opposite to the adhesion panel.

8. The noise attenuating balloon deflation regulator of claim 7 wherein the perforation pin is extended through the aperture by depressing an actuation button positioned directly over the aperture opposite to the adhesion panel.

* * * * *